Feb. 11, 1958
G. L. SIMON
2,822,735
FILM CUTTING MECHANISM
Filed Oct. 21, 1955
4 Sheets-Sheet 1
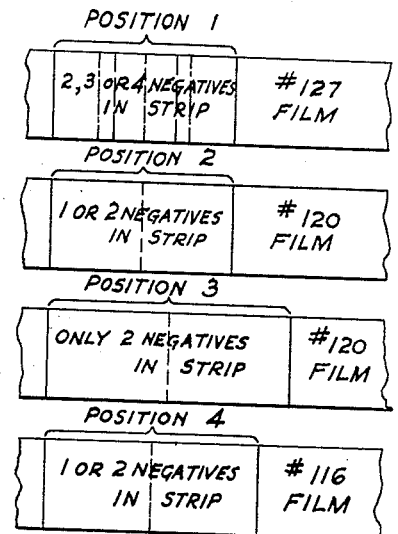
Fig. 6
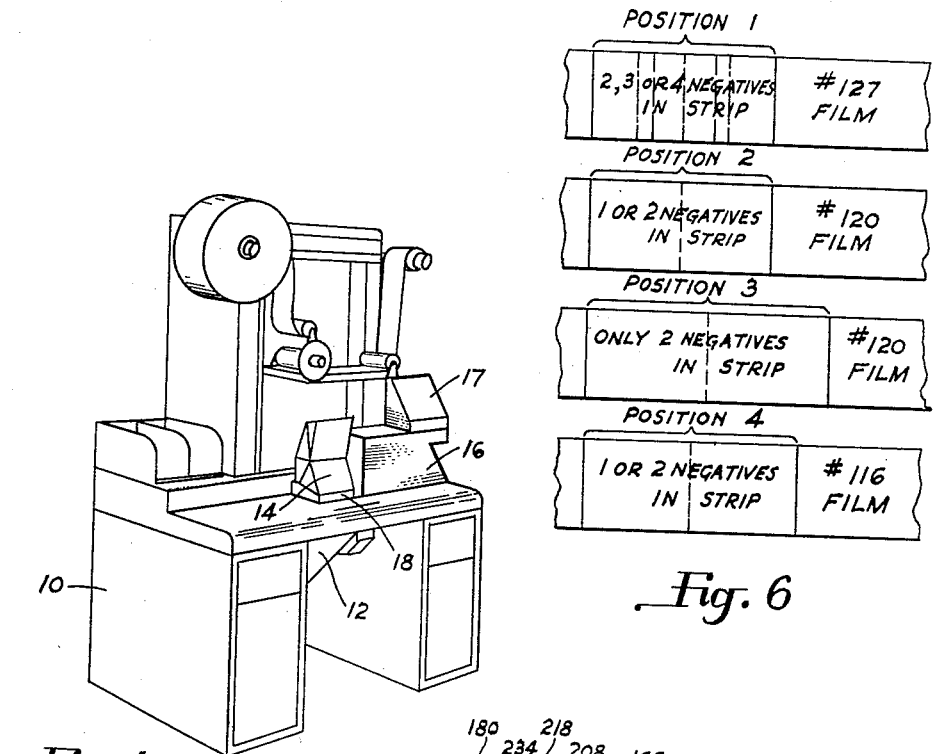
Fig. 1
Fig. 2
INVENTOR.
GEORGE L. SIMON
BY
ATTORNEY Feb. 11, 1958  G. L. SIMON  2,822,735
FILM CUTTING MECHANISM
Filed Oct. 21, 1955  4 Sheets-Sheet 2

INVENTOR.
GEORGE L. SIMON
BY
ATTORNEY

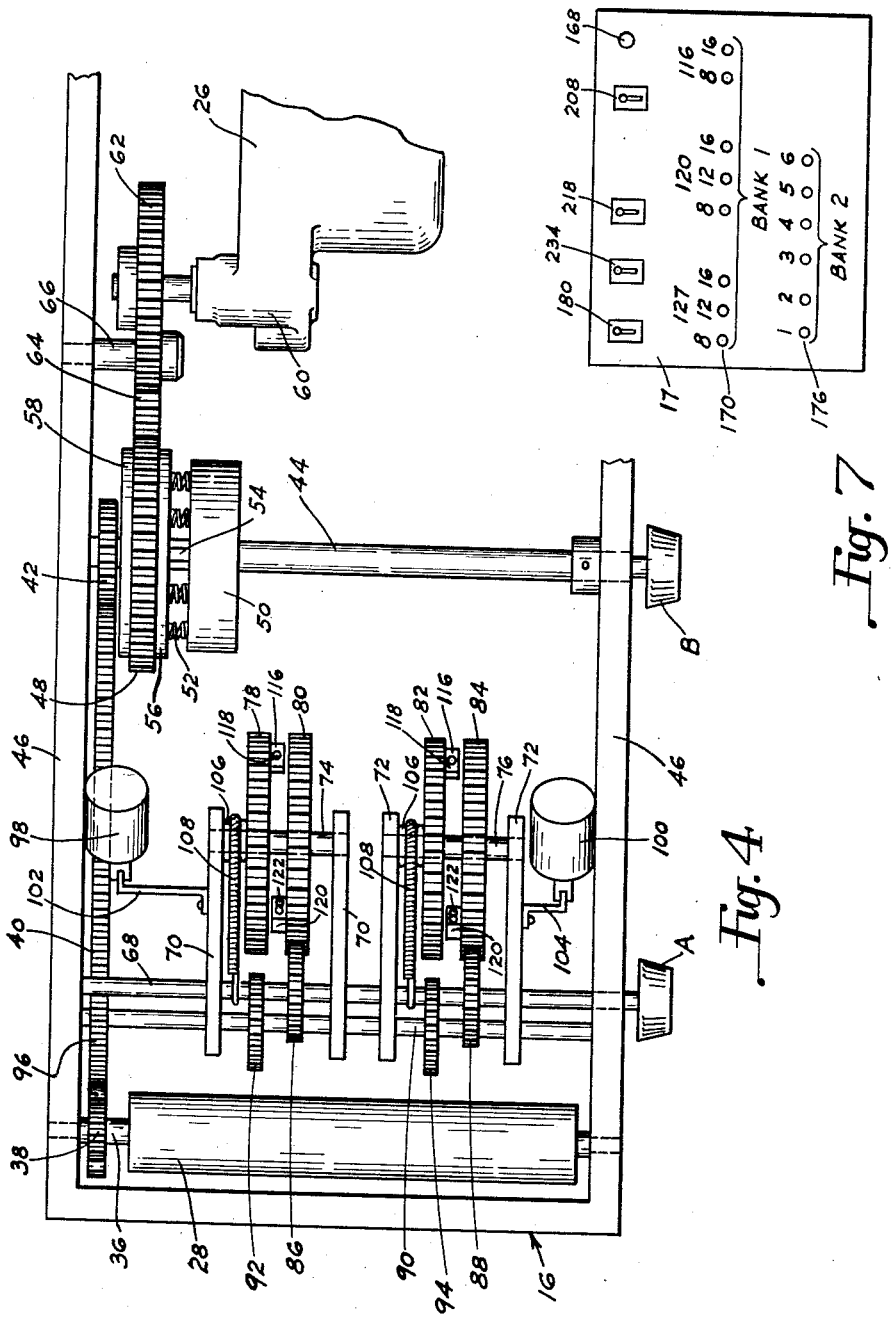

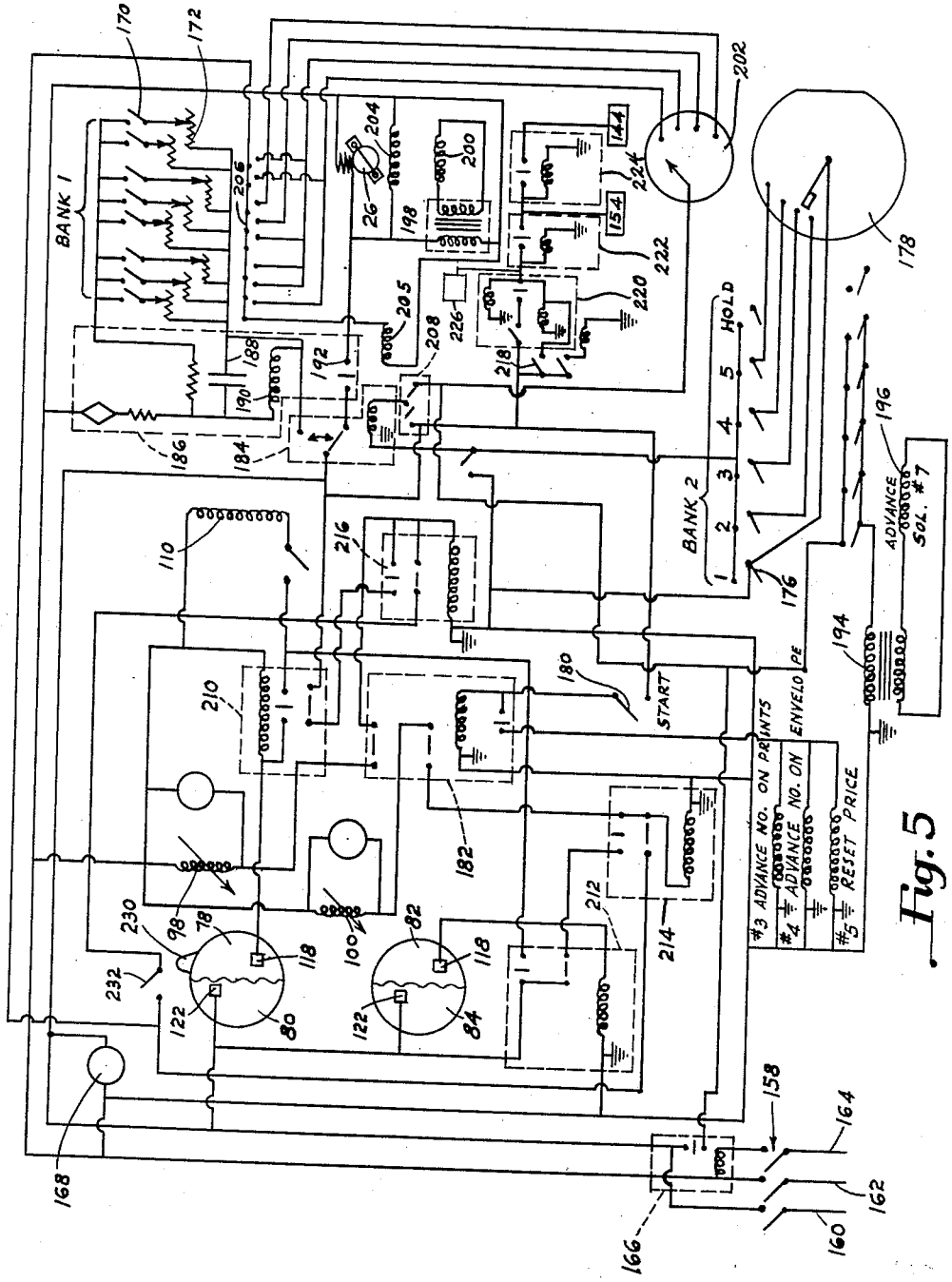

United States Patent Office 2,822,735
Patented Feb. 11, 1958

2,822,735

FILM CUTTING MECHANISM

George L. Simon, York, Pa.

Application October 21, 1955, Serial No. 541,931

16 Claims. (Cl. 95—75)

This invention relates to improvements in film cutting mechanism, said mechanism not only including cutting means but also film feeding means controlled and operated in a novel manner described hereinafter.

Many improvements have been made in recent years relative to the printing of photographic positives from negatives by automatically controlled means, whereby the timing of exposures of the positive photographic paper no longer presents any great problem in obtaining satisfactory photographic results at low cost due largely to the elimination of much of the human factor which previously was required in developing and printing of photographs. However, at present, there still is a considerable amount of manual operations of various kinds required in the complete handling and processing of the popular types of roll film which comprise the negatives with which the positive photographic exposures are made.

Many attempts have been made to feed the entire strips of developed negative film past the photographic exposure mechanism while the negatives are in registry with sensitized photographic paper but, after the exposure of the paper and film negative has been made, a long strip of film negatives frequently are cut into individual negatives or uniform groups of individual negatives by manual means such as conventional photographic cutters. This is not only costly due to the employment of individual operators to perform the cutting but the human element involved also frequently results in uneven and otherwise undesirable cutting of the negatives.

A few attempts have been made to provide power operated mechanism for cutting strips of film into individual negatives for example, such mechanism requiring some marking or indexing means upon the film such as slits or perforations which were placed in the film either at the time of manufacture thereof or incident to the operation of the printing frame through which the film was passed as each negative was subjected to the exposure of the sensitized photographic paper. Electrical operating mechanism for the cutter which was responsive to the slits or perforations formed in the film required the use of feeler members which cooperated with said slits or perforations for purposes of operating the cutter. Such arrangements have not been satisfactory however due primarily to the occurrence of dirty contacts, highly sensitive contacts which frequently required adjustment in order to function satisfactorily, or the complexity of the mechanism rendered the production cost thereof too high to permit the mechanism to become popular.

The problem of providing a satisfactory film cutting mechanism also is highly aggravated by the fact that there are three principal popular sizes of roll film identified in the trade as Nos. 116, 120 and 127. There also are sizes Nos. 616 and 620 but these, as far as the actual size of the film is concerned, are the same as sizes 116 and 120. According to various makes of cameras, size 116 film may be used so as to have either 8 or 16 exposures on each strip, size 120 may be used to have either 8, 12 or 16 exposures on each strip, and size 127 may be used to have the same number of exposures as size 120. Thus, it will be seen from the foregoing that eight different sizes of negatives are possible relative to using the three different sizes of film now manufactured in large quantities for the trade. These individual negatives vary in length from the smallest which is 1⅛" long to the largest which is approximately 4¼" long. The other dimension of these negatives will be controlled by the width of the film strips, the width of these three sizes of popular film varying from 1⅝" wide to 2¾" wide, all of these dimensions being approximate.

In view of the rather minute size of particularly the smallest sized negatives and especially those on the No. 127 film, it has been found desirable to dispose as many as four of these smallest sized negatives in a single strip of cut film when the entire strip of film is cut following the development of positive photographs therefrom, whereby the negatives may be handled more readily. Nevertheless however the different lengths of negatives, as well as the inclusion of different numbers of the negatives in strips to be cut from the entire strip of negatives, demands that any cutting apparatus which is to be satisfactory must be capable of being set to cut different lengths of film, in accordance with film sizes and numbers of exposures in each strip.

The present invention has been devised to provide film cutting mechanism which is far more automatic in nature than any which has previously been developed and is capable of handling all of the popular sizes of film and cut the same into conventional lengths depending upon the number of exposures provided in each roll of film of the various sizes. Due to the eight different sizes of negatives possible from the three popular sizes of film, it is necessary to utilize eight different exposure frames which are interchangeable in the apparatus. The cutting mechanism of the novel structure is spaced from the film exposure station and the structure has been so arranged that only four different distances will be required between the cutter and the nearest edges of the openings in the exposure frames.

As distinguished from the prior art in film cutters which have utilized perforations and slits to control the operation of the cutting mechanism, the present invention includes means operable to measure the film strip as it moves through the apparatus relative to the cutting mechanism, and selective means which are settable according to the size of the film, as well as the number of prints to be made of each negative, are provided so that, from the time each strip of film is introduced and oriented relative to the machine, until the time the last negative has been cut, only a single operator is required for purposes of operating the control switch for the exposure light.

Still another advantageous and desirable aspect of the present invention comprises conveying mechanism by which the cut strips of film are transported to means holding a receptacle such as an envelope of the type now commonly used by photographic establishments, the cut negatives automatically being discharged into said envelope. Further in accordance with the invention, means are included which automatically print the price of the order upon the envelope and additional means then release the envelope from the device so that a new envelope for the next order may be placed in operative position upon the mechanism. Preferably the entire control mechanism as well as the various means requiring preliminary setting, are electrical, except for centering the negatives relative to the exposure opening.

Details of the foregoing objects and advantages as well as of the invention, and other objects thereof, are set forth in the following specification and illustrated in the accompanying drawings comprising a part thereof.

In the drawings:

Fig. 1 is a perspective view of an exemplary photographic printing mechanism, including a film cutting unit embodying the principles of the present invention.

Fig. 2 is a fragmentary front elevation of a portion of the device shown in Fig. 1 but illustrated on a larger scale in order to represent the relation of the cutting mechanism to certain portions of the film printing mechanism.

Fig. 4 is a top plan view of a portion of the mechanism shown in Fig. 3, the same being illustrated on a still larger scale than Fig. 3.

Fig. 5 is a diagrammatic wiring layout of the various circuits for the control and operating mechanism of the elements of the film cutting unit illustrated in the preceding figures.

Fig. 6 is a diagrammatic illustration of the relative length of negatives on strips of conventional commercial film, said strips being shown in fragmentary manner.

Fig. 7 is an enlarged elevation of the control panel per se of the film cutting unit of the present invention.

Figure 3:
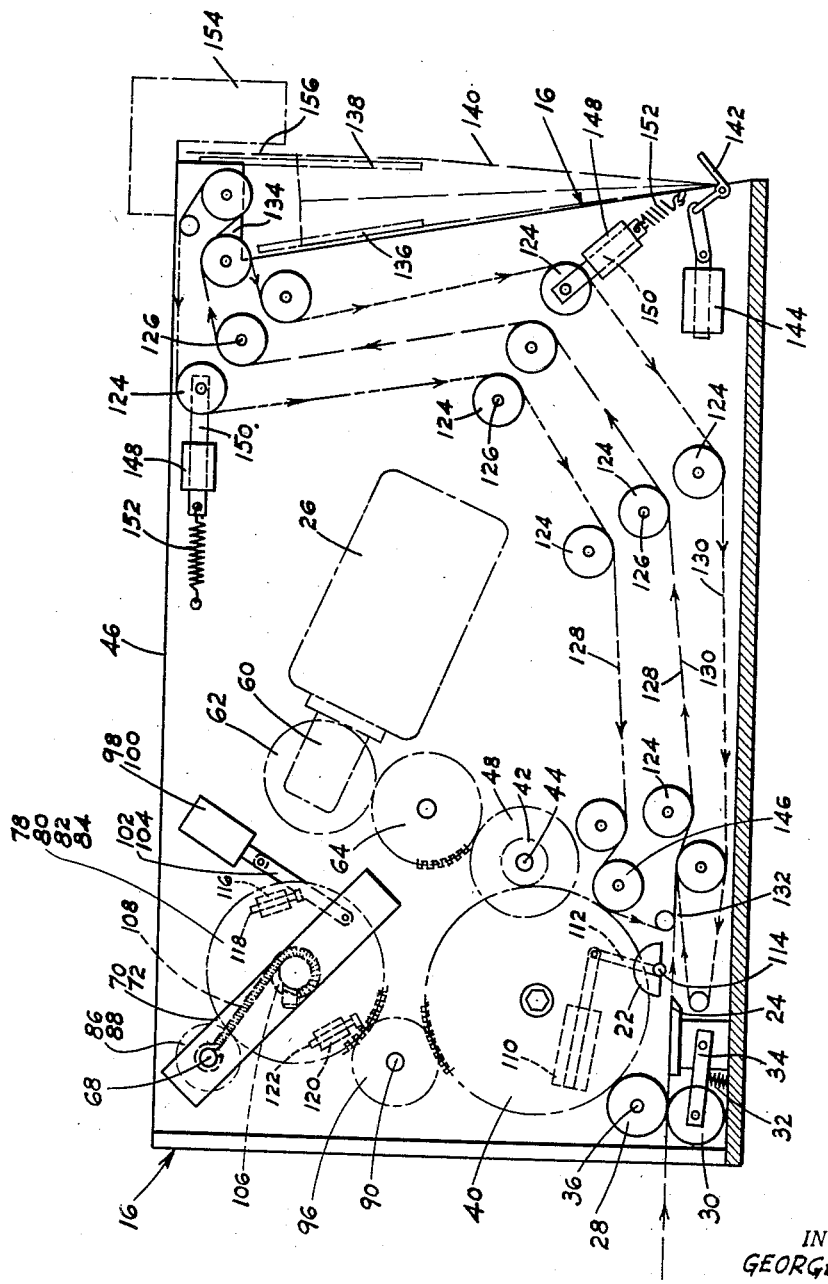
Fig. 3 is a side elevation of the film cutting unit illustrated in Figs. 1 and 2 but shown on a still larger scale and the front cover has been removed to expose the various elements of the mechanism to better advantage.

When rolls of exposed photographic film are being prepared for development and the printing of photographic positives therefrom, said rolls usually are separated into groups of like sizes and numbers of exposures. Hence, as each group of films is developed and the photographic positives are to be printed therefrom, a minimum amount of setting is required in the various machines and mechanisms used for such operations. To illustrate more clearly the different possibilities in the sizes of negatives and correspondingly in the sizes of photographs possible with various popular sizes of commercial film, reference is directed to Fig. 6 wherein it will be seen that No. 127 film conventionally is cut on the two solid lines illustrated therein, but each such cut length of film may comprise either two, three or four negatives, depending upon whether 8, 12 or 16 photographs were taken on the entire strip of film. No. 120 film likewise is used for the same total number of exposures but it is not possible to use a single length of cut film to contain an aliquot number of individual negatives on the film. Accordingly, two different lengths of cut strips are required in handling No. 120 film as illustrated respectively between the pairs of solid lines indicated position 2 and position 3. Size 116 film can be used in different cameras respectively forming 8 or 16 negatives on a single strip of the film. Accordingly, the cut strips of negatives designated by the two solid lines in the lowermost illustration of Fig. 6 and indicated position 4 will serve to accommodate either one or two negatives, depending upon the number of exposures made upon the entire strip of film. Film Nos. 616 and 620 are the same as Nos. 116 and 120 respectively except for a difference in the spool upon which the film is wound.

DESCRIPTION OF MECHANICAL APPARATUS

Referring to Figs. 1 and 2, a conventional commercial photographic exposure and printing unit 10 is shown, the same including an exposure lamp housing 12 which communicates with the exposure compartment 14 of the unit 10. A film advancing and cutting unit 16, embodying the principles of the present invention, is constructed to be mounted upon the unit 10 in the manner illustrated in Figs. 1 and 2. After a developed strip of commercial film for example is moved through the exposure compartment 14, it is automatically fed through the unit 16 by mechanism therein comprising part of the present invention.

The unit 16 also includes a control panel 17 which has arranged thereon various switch levers and buttons, settable control members, and indicating lights to be described in detail hereinafter, the same being included in the wiring diagram set forth in Fig. 5. Further, the exposure compartment 14 has means to receive at any one time a single exposure frame 18 of a set of said frames. In accordance with the exemplary present arrangement, as described above and also as set forth hereinafter in Table 1, the mechanism comprising the present invention is arranged to handle three different widths of commercial film, each of which is capable of being used to include different numbers of individual exposures, whereby a total of eight different sizes of individual negatives must be handled by the apparatus. However, it is to be understood that the invention is not to be restricted to this number of negatives, the latter merely being illustrative. Accordingly, there will be eight different sizes of exposure frames 18, each having an opening 20 therein through which exposures from the lamp house 12 are made onto sensitized photographic printing paper.

*Table 1*

| Film Width | Size No. of Film | Exposures per Film | Negatives per strip to be cut | Setting Position of Knob A |
|---|---|---|---|---|
| 1⅝″ | 127 | 8 | 2 | 1 |
| 1⅝″ | 127 | 12 | 3 | 1 |
| 1⅝″ | 127 | 16 | 4 | 1 |
| 2¼″ | 120 and 620 | 8 | 1 | 2 |
| 2¼″ | 120 and 620 | 12 | 2 | 3 |
| 2¼″ | 120 and 620 | 16 | 2 | 2 |
| 2⅜″ | 116 and 616 | 8 | 1 | 4 |
| 2⅜″ | 116 and 616 | 16 | 2 | 4 |

The film advancing and cutting unit 16 includes a preferably oscillatable cutter 22, the left-hand end of which, as viewed in Figs. 2 and 3, constitutes the cutting edge. This cooperates with a fixed shearing blade 24 shown in Fig. 3. In Fig. 2, it will be seen that the edge of exposure opening 20 nearest the cutter 22 is designated by a line X—X, while the cutting edge of the cutter 22 is designated by a line Y—Y. The distance between the lines X—X and Y—Y may be changed in accordance with the invention due to the fact that the sizes of the openings 20 in the various exposure frames 18 are of different lengths as viewed in Fig. 2, whereby the position of the line X—X will vary relative to the substantially fixed line Y—Y. In accordance with the invention, an important object thereof is to move the film from the opening 20 to the cutting edge of cutter 22 by a preferably constant speed electric motor 26 and measure the film while being so moved in order to energize the actuating mechanism for cutter 22 when a measured predetermined length of film has been moved a distance equal to any desired position of the line X—X relative to line Y—Y as controlled by the particular exposure frame 18 positioned in exposure compartment 14. Such measuring mechanism will be described hereinafter. However, it has been found that four different distances between the lines X—X and Y—Y will suffice to accommodate all of the different sizes of cut negatives for the three different popular sizes of commercially used film contemplated for use with the present invention. Settable control mechanism to be described hereinafter in detail includes four positions at which the same may be set to correspond respectively to these different distances. At the commencement of operation of the mechanism shown in detail in Fig. 3 comprising the unit 16, a strip of film of any of the above described sizes is passed through a selected exposure frame 18 and the lead end of the film is placed between the feed roller 28 and the backing roller 30. The feed roller 28 preferably is formed from rubber or the like, while the backing roller 30 preferably is formed of polished steel and is mounted for movement toward the feed roller 28 by any suitable means such as springs 32 which operate against the supporting links 34. Roller 28 is fixed to a shaft 36 having a spur gear 38 fixed to one end thereof which meshes with large driving gear 40 which, in turn, meshes with spur gear 42 fixed to shaft 44. Adjusting knob B is fixed to one end of shaft 44 and is disposed on the exterior of housing 46 of unit 16. If desired, the ends of the various shafts may be mounted in suitable bearings formed in the walls defining unit 16, where appropriate. After the leading end of the strip of film is disposed between rollers 28 and 30, the operator may then manipulate knob B to move the film in feeding direction for example until the first negative is centered with the opening of the selected exposure frame 18.

The unit 16 also includes a driving gear 48 rotatably mounted upon shaft 44 but arranged to be moved with said shaft through clutch mechanism comprising a thick disc 50 containing a plurality of cavities in which are disposed a series of compression springs 52. Suitable means such as a pair of pins 54 project perpendicularly from disc 56 and are slidably received in suitable apertures formed in disc 50, whereby the disc 56 may move axially upon shaft 44 relative to disc 50. Another clutch disc 58 also is fixed to shaft 44, the discs 56 and 58 preferably being of suitable frictional material such as resin, fiber, or the like. Through the action of springs 52, driving gear 48 is releasably gripped between discs 56 and 58 for movement with shaft 44 during normal operations of the device. Hence, gears 42 and 48 normally will move in unison but, when adjustment of the film relative to printing frame 18 is desired however, such adjustment may be made by knob B, as described above, whereupon gear 42 will be moved relative to gear 48 due to the slippage afforded by the clutch construction described above.

Motor 26 preferably is provided with suitable internal gear reduction means 60 which drives drive gear 62 that in turn meshes with and drives intermediate gear 64, the latter being mounted upon a suitable stub shaft 66. Hence, it will be seen that motor 26 normally drives the feed roller 28 for purposes of advancing the film the distance of one negative between printing operations within compartment 14.

Extending between the side members of the housing 46 is a supporting shaft 68 which pivotally supports two pairs of links 70 and 72. Extending between each pair of said links are short shafts 74 and 76, the shaft 74 supporting a pair of large film measuring and switch controlling gears 78 and 80, while shaft 76 supports another pair of film measuring and switch controlling gears 82 and 84. Fixed to shaft 68 for actuation by knob A are a pair of actuating gears 86 and 88 respectively meshing with measuring and switch controlling gears 80 and 84. By this construction, the knob A may be used manually to rotate the gears 80 and 84 respectively relative to gears 78 and 82 for purposes to be described.

Also extending between the front and rear plates of housing 46 is another shaft 90 to which a pair of spur gears 92 and 94 are fixed which are respectively engageable by measuring and switch control gears 78 and 80. Still another spur gear 96 is fixed to shaft 90 and is constantly in mesh with driving gear 40.

The pairs of links 70 and 72 respectively are movable by suitable electrical means such as solenoids 98 and 100 which may be supported by any suitable means such as the walls of housing 46, the armatures of said solenoids being connected respectively to said pairs of lengths by any appropriate means such as linkages 102 and 104. By means of the solenoids 98 and 100, said pairs of links 70 and 72 respectively and independently are movable downward as viewed in Fig. 3 for purposes of engaging the measuring and switch control gears 78 and 82 carried thereby respectively with gears 92 and 94 which are driven at all times by gear 40 which in turn drives the feed roller 28. Hence, whenever the feed roller 28 moves, the gears 92 and 94 will similarly be moved, whereby if the gears 78 and 82 are in mesh therewith, they too will be driven.

Fixed to each of the measuring and switch control gears 78 and 82, are suitable means operable to restore the gears 78 and 82 to a predetermined starting position after the same are disengaged from the driving gears 92 and 94. One specific embodiment of such means is illustrated particularly in Figs. 3 and 4 wherein it will be seen that a small pulley 106 is fixed to each of the gears 78 and 82 and tensioning means such as a coil spring 108 is at least partially wound around each pulley 106, one end of said springs being fastened to said pulleys, while the other ends thereof are anchored to any suitable fixed means such as shaft 68.

The function of the pairs of gears 78, 80 and 82, 84 is to measure the amount of film moved by feed roller 28 while an amount equal to the length of a single negative on the strip of film has been advanced toward the cutter 22, whereby the film then may be stopped for printing purposes. However, if the length of the film measured under such circumstances is less than the desired length of film to be in each cut strip of film, the control mechanism is such that the solenoids 98 and/or 100 will hold at least one of the gears 78 and 82 in mesh with the drive gears 92 and 94 in order that measurement of the film may continue after it has momentarily been halted for printing operations as referred to above, until a length of film of predetermined amount has been moved past the exposure opening in printing frame 18, as defined by the line X—X of Fig. 2, to the cutting edge of the cutter 22, as defined by line Y—Y of Fig. 2, said distance corresponding to the desired length of film to be cut from the film strip. When this occurs, the cutter 22 is brought into cutting engagement with fixed cutter 24 to sever the film.

Operation of cutter 22 is achieved by means of quickly operating mechanism such as solenoid 110, shown in phantom in Fig. 3, the armature of which is pivotally connected to a crank arm 112 fixed to cutter shaft 114, it being understood that the cutters 22 and 24, as well as shaft 114, preferably extend substantially entirely between the side members of housing 46 and, if desired, the solenoid 110 may be supported by one of said side members.

Actuation of the solenoid 110 is controlled by switch means mounted upon the measuring gears 78, 80 and 82, 84. Such switch means may be relatively simple and, for example, comprise insulation blocks 116 fixed to each of gears 78 and 82 and each having a metallic contact member 118 adjustably mounted therein. The relatively stationary contact members are mounted on gears 80 and 84 and respectively comprise insulation blocks 120 which each carry metallic contact members 122 adjustably supported thereby. It will be understood of course that the contact members 118 and 122 have suitable flexible and preferably insulated electrical conductors extending therefrom to connect them in the control circuit to be described hereinafter.

When the unit 16 is being conditioned at the commencement of the operation upon rolls of film of a certain size and number of negatives for example, the knob A is set to a predetermined indicated position for purposes of disposing the relatively stationary contacts 122 away from the relatively movable contacts 118 on gears 78 and 82 a distance corresponding to the desired length of cut film strips, said length also corresponding to an arcuate segment of the pitch line of the teeth of gears 78 and 82 equal in length to said desired strips of film. Due to the fact that the drive gears 92 and 94 which are engageable by driven measuring gears 78 and 82 are the same diameter as drive gear 96 of shaft 90, peripheral movement of feed roller 28 which moves the film to be cut will be transferred to driven measuring gears 78 and 82 whereby, as the film to be cut is being moved by the feed roller 28, such movement of the film will be transferred directly to the measuring gears 78 and 82, depending upon which is in engagement with the drive gears 92 and 94. Such movement may be either continuous or intermittent but nevertheless cumulative. Further, alternate operations of the cutter 22 are effected respectively by the switch contacts on gears 78 and 80, and the switch contacts on gears 82 and 84. The control means for achieving this is described hereinafter relative to the electric circuit.

In order to handle the present popular sizes of film as described above and including all of the various numbers of exposures for each film, it has been determined that four settings of knob A are all that are necessary to measure satisfactorily the various lengths of cut film used in conventional commercial photography. These cut lengths are illustrated in Fig. 6 by brackets bearing legends corresponding to the positions of knob A. Further, it is necessary to have two measuring control switches comprising contacts 118 and 122 carried respectively by two pairs of measuring gears as described above inasmuch as the location of the cut to be made on any particular strip of film may not be disposable at the cutters while a negative on said film is centered relative to the exposure opening in the exposure frame 18. Hence, after a cut has been made in response to the closing of the switch contact on one pair of measuring gears, the other set of measuring gears is disposed with its contacts spaced apart and actually measuring a succeeding length of film to be cut. Moreover, operation of the cutter 22, for certain sizes of film negatives, must operate while the film is being fed relative to the exposure opening in frame 18. However, due to the fact that the movement of cutter 22 is substantially instantaneous, no interference with the continuing movement of the film into registry with the opening 20 of frame 18 takes place.

After operation of the cutter 22 has taken place as a result of the contacts 118 and 122 of one of the pairs of measuring gears being brought into closed or contacting relationship, control means also are operated for conditioning the actuating solenoid 98 or 100 for that particular pair of gears, whereupon the supporting links 70 or 72 of that pair of gears are moved to disengage the driven gear of the pair from its driving gear 92 or 94. Upon such disconnection of said gears taking place, the spring 108 then may restore the driven gear 78 or 82 of that pair to its starting position wherein its contact 116 is spaced from the relatively stationary contact 122 on the other gear of said pair. Suitable stop means, not shown, are utilized to determine said starting position of the gears 78 and 82.

FILM TRANSFER AND PACKAGING

The present invention also includes suitable mechanism for rapidly moving the cut strips of film from the cutter 22 into a receptacle such as a conventional bag in which photographic films and printed pictures normally are dispensed to the customer. Referring now particularly to Fig. 3, it will be seen that a plurality of conveyor supporting rolls 124 are arranged upon suitable supporting shafts 126 which may extend between the members defining compartment 46 as shown in Fig. 4, the rolls being arranged to support a pair of endless conveyors 128 and 130 of any suitable width and material but preferably such material which will not scratch or otherwise harm the film surfaces. The conveyors respectively are positioned by their supporting rolls 124 so that at least substantially half of each conveyor is in engagement with substantially half of the other conveyor and moving at the same speed, thereby defining a common course along which the cut negatives are moved from the entrance 132 of said course to the exit 134 thereof. Convenient means comprising a pair of spaced blades 136 and 138 also are fixed adjacent the exit 134 of the film course, whereby a bag or envelope 140 may be mounted with its open end uppermost so as to surround the blades 136 and 138 and held thereby in position to receive the cut films as they are discharged from the exit 134. The lower end of the bag or envelope 140 is supported by a preferably movable member such as a bell crank 142. Suitable actuating means such as a solenoid 144 is arranged with its armature connected to the inner leg of the bell crank 142 as clearly illustrated in Fig. 3, whereby at the completion of an order being delivered to the envelope 140 for example, the solenoid 144 is actuated so as to move the outer leg of the bell crank discharge member 142 downwardly and thereby permit the completed order within the bag 140 to fall by gravity from off of the blades 136 and 138.

The conveyors 128 and 130 are driven as the feed roll 28 is driven. This may be accomplished conveniently by providing a drive roll 146 which is of similar diameter to the conveyor rolls 124 but preferably formed of frictional material such as rubber so as to frictionally engage the conveyor 128. The drive roll 146 preferably is fixed to its shaft and a gear likewise is fixed to one end of said shaft so as to mesh with gear 40. Said gear is not illustrated but may be similar to the gear 38 which drives feed roll 28. The interengagement of conveyors 128 and 130 will be adequate to cause conveyor 130 to be driven by conveyor 128. In order to afford adequate coengagement between the conveyors, they preferably are each provided with tension means comprising one of the conveyor rolls 124 for each conveyor being movably mounted relative to the housing 46. From Fig. 3, it will be seen that one example of such adjustable support for these conveyor rolls of each conveyor may comprise a guide bearing 148 in which a yoke 150 is slidably supported to support respectively said conveyor rolls 124 for each conveyor. The outer end of each yoke 150 may be connected to a tension spring 152 of suitable strength to effect the desired tensioning of the conveyors.

Another advantageous feature which may be incorporated in the unit 16 is an order numbering and pricing unit 154. This may be of any suitable commercial type of which a number are available. The same is automatically operable by electric means included in the circuit to be described, hence details thereof are not illustrated. The exemplary unit as shown in Fig. 3 is arranged to operate upon the flap 156 or envelope 140 for example prior to the envelope being removed from the unit 16.

Following the exposure of the last negative in a given strip of film relative to opening 20, means are provided in the circuit which are operable automatically to insure the conveying of the last cut unit of film through the conveyors 128 and 130 to the envelope 140. Additional means are also provided to afford intervals during which the numbering and pricing of the order upon the envelope flap 156 may take place prior to the automatic ejection of the completed order in the envelope 140 from the unit 16 as a result of the operation of bell crank 142.

ELECTRIC CIRCUIT

The electric circuit which supplies current to the various components of the film cutting and feeding mechanism described above is illustrated diagrammatically in Fig. 5. Referring particularly to the lower left-hand corner of said figure, a 3 pole main switch 158 is disposed in the supply line comprising three wires 160, 162 and 164, the first being a conventional 115 v. line, the middle wire 162 being the ground, and wire 164 is connected in the circuit of the printing light, not illustrated in Fig. 5. The printing light control button or switch, which may be hand or foot operated as convenient, is not shown in the present figures but it will be understood that the same is in the circuit of line 164. Hence, when the exposure light is on, power relay 166, in circuit with the inlet lines, is energized. When the main switch 158 is on, a signal light 168 becomes lit.

Control panel 17 contains a row of push button type switches 170, identified as bank 1 in Figs. 2, 5 and 7. These switches preferably are of the type that if one switch has previously been closed, and another switch subsequently is pushed, the previously closed switch automatically will be opened. A series of rheostats 172, each individually adjustable to produce a desired time delay, respectively are connected to the various switches 170 of the series thereof in bank 1. Each of the rheostats 172 preferably is adjustable readily such as by a screw driver or otherwise for a period of time corresponding to the amount of time required for the motor 26 to move a strip of film a distance equal to one negative by the feed roller 28. Motor 26 preferably is a repulsion motor. It will be seen from Fig. 7 particularly that the row of switch buttons included in bank 1 are divided into groups corresponding to film sizes Nos. 127, 120 and 116, and these groups are divided into the number of negatives in the roll or strip of film for each of said film sizes. When the power relay 166 is energized and one of the switches 170 of bank 1 is closed, the rheostat 172 and the circuit connected thereto also will be energized each time the printing light is turned on. This comprises imposing a signal upon the electrical control means regulated and influenced by the various switches and settable members of control panel 17.

The control panel 17 also includes another row of switches identified as bank 2, this row preferably comprising switches identified by numbers from 1 to 6 and corresponding to the number of prints to be printed from each negative, with the exception of switch No. 6 which is intended as a Hold switch, whereby as many prints as may be desired above five in number may be printed, when switch 6 is closed. The switches 176 of bank 2 preferably are of the self-locking type but only one switch may be closed at a time. An electric timer or step relay 178 is connected to the bank 2 of switches, said step relay being arranged to hold the switches closed through a number of printing operations corresponding to the number of the switch 176 which has been closed.

Pressing of the desired switch 176 of bank 2 may be done at the same time the desired switch 170 of bank 1 is closed. After the operator has advanced the leading end of the film manually by turning knob A so as to center the first negative relative to the exposure opening 20, starting switch 180 then is closed. Said switch normally is open but, when closed, energizes relay 182 which preferably is of the three pole type. When energized, it releases solenoids 98 and 100 which respectively normally hold film measuring gears 78 and 82 in engagement with their driving gears 92 and 94. Such releasing of the solenoids 98 and 100 permits suitable spring means, not shown, to disengage said film measuring gears from their driving gears as described.

It is to be understood that the energizing of the printing light may be effected automatically if desired, rather than manually or by foot operated switch or the like. After the printing of each print is completed, the printing light is extinguished. Each time the requirements of bank 2 are satisfied, the motor 26 again is energized by the motor timing circuit which includes a 115 volt, single pole, double throw relay 184. Said relay includes a coil connected to bank 2. Upon the relay 184 becoming energized, it also energizes a complex relay 186 including a capacitor 188 which receives current to hold the coil 190 energized after capacitor 188 is de-energized and until the current in the capacitor is discharged through the selected rheostat 172 of bank 1, it being shown that the relay 186 is connected in circuit with the various rheostats 172, whereby the selected rheostat 172 becomes part of the circuit of relay 186. After the selected rheostat and the capacitor 188 have discharged to de-energize the coil 190, the switch 192 is restored to its normally open position, thereby interrupting the circuit to the motor 26. Hence, it will be seen that the selection of the desired switch 170 of bank 1 determines the length of time the drive motor 26 will operate to move the film the distance of one negative by means of feed roller 28.

The timer 178 actually comprises a stepping relay which counts the number of prints to be made from each negative. For example, assume that three prints of each negative are desired. Button No. 3 of bank 2 is pressed to close the switch. When the printing light goes on, power relay 166 is energized and also energizes the circuit to the advance transformer 194 and advance solenoid 196. These serve to advance the relay 178 to No. 2 position when the printing light goes off. The bank of switches connected to the transformer 196 to the right thereof as shown in Fig. 5 is a counterpart of the row of switches directly below the legend "Bank 2." These two rows of switches comprise a composite interlocking bank of switches respectively interconnected by a set of operating switch members individually movable, only one at a time, to simultaneously close one switch of each set and also interconnect the terminals of the closed switches. To make the second print of the same negative, the printing light again is energized and once more activates power relay 166 as well as advance transformer 194 and advance solenoid 196, whereby when the printing light goes off the stepping relay 178 is advanced to No. 3 position. When the printing light is energized again to make the third print of the same negative, and power relay 166 is again energized but, when the light goes off, the reset transformer 198 and the solenoid 200 are energized, thereby returning the timer or stepping relay 178 to zero position and advancing the counter 202 to its next position.

Each time the drive motor 26 is energized, advance solenoid 204 also is energized and revolves the counter 202. It will be seen that the counter 202 has four positions, these determining the number of exposures between operations of the cutting mechanism. The correct positioning of the counter 202 is determined by a lower set of switch contacts 206 of bank 1, these automatically being closed simultaneously with the operation of the push button switches 170 of the upper row thereof on bank 1. Hence, it will be seen that counter 202 functions to actually count the number of film negatives to pass the cutter before the cutter operates, as determined by the push button switches of bank 1. Further, each time the movable member of stepping relay or timer 178 is restored to zero, the movable member of counter 202 is advanced to its next position. However, when the movable member of counter 202 reaches its maximum position for any setting of the switch members of bank 1, current flows through the reset solenoid 200 and returns the movable member of counter 202 to its first position.

The sixth button of bank 2 on control panel 17 is not connected to the stepping relay or timer 178 as is clear from Fig. 5. Therefore, the closing of this switch will not advance timer 178. Hence, as long as button No. 6 or the Hold button remains in closed position, the negative will not be advanced relative to the exposure opening 20. Such an arrangement is useful for example in the printing of Christmas cards and the like where large numbers of a single negative are desired. The counting of the number of prints made by such negative while remaining stationary in the printing frame must be done either mentally or by separate counter until the desired number has been printed. Then, multiple switch 208 is operated in one direction to close one of the pairs of switch contacts arranged to advance the film by energizing the driving motor 26. A single operating lever is arranged for the multiple sets of contacts and switch members, whereby when one section of the switch is closed, the other will be opened and vice versa. When the switch actuator is moved in the opposite direction, no printing with the negative takes place as, for example, where the negative is overexposed and no print is desired, but the relay 184 nevertheless is energized to advance the film the same as if the printing light had been energized.

The knife or cutter 22 is energized by solenoid 110. A pair of relays 210 and 212 are connected in the circuit for the solenoid 110. These relays for example may be of a two amp. capacity and each has a normally open and a normally closed pair of switch poles, either being single throw. The relays also are respectively in the circuits of the switch contacts 118 and 122 operated by measuring gears 78, 80 and 82, 84. When the normally open contact of each of these relays is closed, it will energize the cutter solenoid 110. When the normally closed contact of each relay is opened, it will release the relay 214 which, in turn, will release the small power solenoid 100.

In addition to the relay 214, another relay 216 operates in conjunction with relay 214, these actually serving as holding solenoids. When they receive an impulse from timer or counter 202 of bank 1, they become energized and lock in energized position, thus keeping solenoid 98 or 100 energized and in turn maintaining the measuring gears 78 and 82 in operating position against their driving gears 92 and 94.

After the last negative in any strip has been subjected to the printing light sufficiently to satisfy the requirements of the settings of bank 2, switch 218 is operated, this preferably being a double pole, single throw switch which, when closed, actuates a number of elements of the circuit shown in Fig. 5. This switch may be referred to as an End-of-order switch. For example, when this switch is closed, it energizes the relay 220 of the order number printer mechanism of unit 154. It also energizes relay No. 222 of the totalizing and price printing elements of unit 154. Switch 218 further energizes relay 224 which for example may be a five second delay-providing relay which permits the driving motor 26 to operate for said period of time to allow the conveyors 128 and 130 to clear all of the negatives from the unit 16 and discharge them into the envelope 140. At the same time that relay 224 is energized, a second relay 226 is operated therewith, the relay 226 for example being of a two second capacity, after which two second interval the solenoid 226 closes, thus printing price of the order upon the envelope flap 156, as described above.

Relay 226, in turn, operates preferably a still additional relay 228 connected in the circuit of the solenoid 144 of the actuator for bell crank 142 which is operated at the end of two seconds, for example, to release the envelope 140 with the completed order therein. The capacity of relay 228 may be any amount of time other than two seconds, if desired.

As the driving motor 26 is operating, it is moving at least one of the measuring gears 78 or 82 in a direction to bring the contact 118 thereon into engagement with the relatively stationary contact 122 on the settable gear of each pair of measuring gears. The solenoids 98 and 100 for these measuring gears are controlled by the relays 214 and 216. After one of the measuring gears has been moved by the drive motor to close the contacts on said set of measuring gears, the relay 210 or 212 is operated to cause the cutter solenoid 110 to function and also break the current in the holding relay 214 or 216 so as to deenergize the solenoid 98 or 100 to disengage the driven measuring gear which has just closed its circuit from its driving gear 92 or 94 by spring action for example, whereupon the gear restoring means such as coil spring 108 will restore the movable measuring gear of that particular set to its starting position. Meanwhile, the measuring gear of the other set of measuring gears may still be connected in its driving circuit, it having already been started in a new driving cycle to measure the next portion of a strip of film to be cut from the remainder of the strip yet to be moved past the exposure opening in the printing frame.

It is to be remembered that the current may operate while the film is in course of being advanced to present a new negative in registry with the exposure opening of the printing frame, whereby it is necessary for the second set of measuring gears to begin to function for example before the first set of measuring gears have completed a cycle or have effected a cutting movement of the cutter.

Upon the commencement of operation of unit 16, measuring gear 78 will be the first to function. Measuring gear 82 can not commence to function unless measuring gear 78 already is functioning. Hence the movable measuring gears of the two sets are prevented from operating to produce the same stroke of the cutter. This is effected by any suitable means such as a small cam 230 provided on measuring gear 78 which is engageable with an operating arm on a suitable switch such as a single pole, single throw switch 232 which is normally closed. For example, a two amp. switch is adequate. Hence, said switch is held open mechanically when gear 78 is in starting or zero position. Switch 232 is connected in the circuit of relay 216, whereby solenoid 98 can not be energized as long as switch 232 is open.

While the invention has been shown and illustrated in its several preferred embodiments, and has included certain details, it should be understod that the invention is not to be limited to the precise details herein illustrated and described since the same may be carried out in other ways falling within the scope of the invention as claimed.

I claim:

1. Film cutting apparatus operable selectively to feed a roll strip of photographic film selected from films of different sizes to permit making prints therefrom and cut said roll strip into cut strips of uniform length each having a uniform number of negatives, said apparatus comprising in combination, film cutting means, film exposure means selectively positionable at various distances from said cutting means in accordance with the length of the negatives, means operable to move a roll strip of film longitudinally relative to said film exposure means sequentially an amount substantially equal to the length of one negative on said roll strip, electric motor power means connected to said film moving means to drive the same, electrical control means for said power means selectively adjustable to vary the movement of the film by the film moving means to conform said movement to the length of the negatives of the film strip, means operable to measure lengths of said film as advanced by said film moving means and interconnected to said cutting means and controlling actuation of the same to sever the strip of film into cut strips of film each having a uniform number of negatives therein, means operable to hold a receptacle for said cut strips of film, and conveying means positioned to receive cut strips of film from said cutting means and operable to move said cut strips of film from said cutting means to said receptacle.

2. The film cutting apparatus according to claim 1 further characterized by said conveying means having a drive member interconnected to said film moving means and operable thereby when driven by said power means.

3. The film cutting apparatus according to claim 2 further including an electrical delay relay and control switch therefor in the electric circuit of said electrical control means for said power means and operable following exposure of the last negative of a roll of film to continue operation of said film moving and conveying means by said power means a period of time as controlled by said delay relay sufficient relative to the speed of said conveying means to insure movement of said last negative to said receptacle.

4. The film cutting apparatus according to claim 1 further including an electrical delay relay connected in the electric circuit of said electrical control means and controlling an electrically operated receptacle release, whereby after sufficient time has elapsed for the last exposed negative in said roll of film to have been delivered to said receptacle, said receptacle release is actuated by said relay to release said receptacle from the holding means therefor.

5. Film cutting apparatus operable selectively to feed rolls of photographic film of different sizes to permit making prints of the negatives thereon and cut said rolls of film into strips of pre-selectable lengths containing one or more negatives in each cut strip, said apparatus comprising in combination, film cutting means, film exposure means selectively positionable at various distances from said cutting means in accordance with negative and film sizes, means to actuate said cutting means, electrical means interconnected to and controlling the operation of said cutter actuating means, said electrical control means being capable of having an electrical signal imposed thereupon to correspond continuously to the location where said roll of film is to be cut by said cutting means while said film is moving to said cutting means, film feeding means operable to engage a roll of film and move it longitudinally relative to said film exposure means a predetermined distance corresponding to the length of one negative, manually operable means interconnected to said film feeding means to permit adjustment of irregularly spaced negatives on said roll of film relative to said film exposure means and correspondingly adjust said electrical control means, control means for said film moving means selectively adjustable to vary the movement of the film by the film feeding means in accordance with the length of the negatives of the film strip, and means operable automatically to respond to the film movement by said feeding means to permit said electrical signal imposed upon said control means to cause said cutting means to operate when the location upon said film as determined by said signal has reached said cutting means.

6. The film cutting apparatus according to claim 5, in which the electrical control means for said cutter actuating means comprises a pair of relative movable switch contacts, one of said switch contacts initially being set a predetermined distance from the other and being movable relative thereto directly proportioned to the movement of the roll of film relative to said cutting means.

7. The film cutting apparatus according to claim 6 in which the movable switch contact is moved by means actuated by said film moving means.

8. The film cutting apparatus according to claim 7 in which a second pair of relatively movable switch contacts are included in said electrical means and are operated by said film moving means similarly to but in sequence with said first pair of contacts, whereby a second signal may be imposed upon said electrical control means before a previously imposed signal has caused operation of said cutters, said pairs of contacts respectively responding to said signals.

9. The film cutting apparatus according to claim 7 further characterized by the movable switch contact being supported by a rotatable gear interconnected to gear means driving a feed roller comprising said film moving means.

10. The film cutting apparatus according to claim 7 further including a pair of rotatable gears respectively supporting said relatively movable contacts, one of said gears being initially movable to set one of said contacts a predetermined distance from the other contact directly proportional to the movement desired for the roll of film to the cutting means, whereby when said film is cut a desired strip length having a predetermined number of negatives in accordance with the setting of the control means will be produced, said one gear being moved by said film moving means during actuation thereof to advance the contact on said gear toward the contact on the other gear, and means connected to the other gear and operable to adjust the contact thereon relative to said one contact incident to adjusting each negative on the roll of film relative to the film exposure means, whereby the cutting of said film will occur at the location dictated by the electrical signal imposed thereupon by said electrical control means.

11. The film cutting apparatus according to claim 9 further including a solenoid connected to said film cutting means and energizable to actuate said cutting means when said contacts upon said gears contact each other.

12. The film cutting apparatus according to claim 9 further including means interconnected to said gear and operable automatically after actuation to the film cutting means to restore said gear and the contact thereon to the original pre-set spaced position thereof relative to the other contact.

13. The film cutting apparatus according to claim 9 further including supporting means for said rotatable gear movable toward and from said driving gear means of said film moving means, means normally positioning said supporting means to dispose the rotatable gear thereon out of contact with said driving gear means for said feed roller, and means operable incident to imposing said electric signal upon said control means to move said rotatable gear into engagement with said driving gear means to initiate movement of said switch contact upon said rotatable gear toward the other contact.

14. The film cutting apparatus according to claim 13 further characterized by said last mentioned means comprising a solenoid energizable by the circuit of said electrical control means incident to imposing a signal upon the latter.

15. Film cutting apparatus operable selectively to feed rolls of photographic film of different sizes to permit making prints of the negatives thereon and cut said rolls of film into strips of pre-selectable lengths containing one or more negatives in each cut strip, said apparatus comprising in combination, film cutting means, film exposure means selectively positionable at various distances from said cutting means in accordance with negative and film sizes, means to actuate said cutting means, electrical means interconnected to and controlling the operation of said cutter actuating means, said electrical control means being capable of having an electrical signal imposed thereupon to correspond continuously to the location where said roll of film is to be cut by said cutting means while said film is moving to said cutting means, film feeding means including an electric motor operable to engage a roll of film and move it longitudinally relative to said film exposure means a predetermined distance corresponding to the length of one negative, manually operable means interconnected to said film feeding means to permit adjustment of irregularly spaced negatives on said roll of film relative to said film exposure means and correspondingly adjust said electrical control means, control means for said film moving means selectively adjustable to vary the movement of the film by the film feeding means in accordance with the length of the negatives of the film strip, said control means comprising a bank of interlocked switches of which only one is operable at a time and respectively connected to a plurality of electrical timing mechanisms respectively set for different predetermined periods of time corresponding to the time required to drive the film moving means sufficiently to advance the roll of film the length of one negative of the various sizes capable of being handled by the apparatus, whereby the selected timing mechanism is connected by the switch therefor into the power circuit for said electric motor, and means operable automatically to respond to the film movement by said feeding means to permit said electrical signal imposed upon said control means to cause said cutting means to operate when the location upon said film as determined by said signal has reached said cutting means.

16. The film cutting apparatus according to claim 15 wherein said control means for said film feeding means additionally includes electrically operated counting mechanism connected in the circuit of said timing mechanisms and operable by a set of selectable switches corresponding to the number of exposures to be made of each negative before the negative is advanced as controlled by the selected electrical timing mechanism of said control means, the operation of said film feeding mechanism as controlled by said timing mechanism being delayed by said counting mechanism until the selected film negative has been exposed the desired number of times.

References Cited in the file of this patent

UNITED STATES PATENTS

| | | |
|---|---|---|
| 1,960,945 | Krueger | May 29, 1934 |
| 2,408,363 | Beckman et al. | Oct. 1, 1946 |
| 2,592,735 | Pirmov | Apr. 15, 1952 |
| 2,682,817 | Gross | July 6, 1954 |
| 2,727,570 | Hempel | Dec. 20, 1955 |